Figure 1:
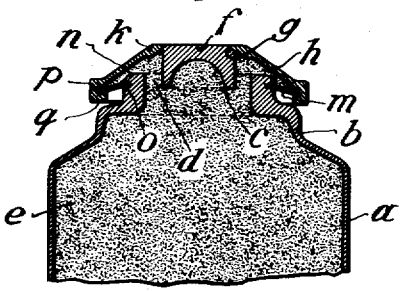

Nov. 8, 1932.

W. KALB

TUBE AND LIKE CONTAINER

Original Filed Sept. 4, 1925

Re. 18,649

Inventor:
Walther KALB
by
Lyons, Kellenberg & Farley
Att'ys

Reissued Nov. 8, 1932

Re. 18,649

UNITED STATES PATENT OFFICE

WALTHER KALB, OF LEIPZIG, GERMANY, ASSIGNOR, BY MESNE ASSIGNMENTS, TO AMERICAN TUBE AND CAP CORPORATION, A CORPORATION OF DELAWARE

TUBE AND LIKE CONTAINER

Original No. 1,601,396, dated September 28, 1926, Serial No. 54,394, filed September 4, 1925, and in Germany April 22, 1925. Application for reissue filed September 21, 1932. Serial No. 634,211.

My invention relates to a closure for tubes and like containers the contents of which are ejected not immediately through the opening of the neck of the tube but through an opening in the closure which is permanently connected with the neck of the tube. The closure makes joint with a seating which projects beyond the outlet in the neck of the tube. These tubes have the advantage that the closure cannot be lost. But it is difficult so to design the connection of the closure with the neck of the tube that the contents, which also fill the space between the closure and the neck of the tube, are well protected against access of air. This is particularly necessary when the contents consist of semi-fluid materials which readily dry in air, as tooth paste, colours, varnishes and so forth, as otherwise the drying of the contents makes it difficult or impossible to open the closure.

In known tubes of this kind it has been proposed to screw or thrust the closure upon the neck of the tube. This method of fastening does not in practice enable the requisite tight closure to be attained.

According to my invention tight closure is ensured by connecting the closure with the neck of the tube by the aid of an elastic snap device which is so distorted or under tension that when pressed in one direction it will press the closure on the seating on the neck of the tube, and when pressed in the opposite direction it will hold the closure at a distance from the seating. The elastic device may consist of springs rigidly fastened at one end, but the other end must have some possibility of movement. The air tight closure of this movable connection is ensured by causing the springs in their two possible end positions to make close joint with the closure or the neck of the tube. For instance if the springs are distorted leaf springs projecting like the rays of a star from a centre the surfaces between the springs may be closely covered with elastic material so that the contents of the tube are safe-guarded against access of air when the closure is closed.

It is preferred to connect the closure with the neck of the tube by an elastic device formed by an annular spring, which is so distorted that when pressed in either direction it exerts a spring pressure. The space between the closure and the neck of the tube is then bounded by the closure and the annular spring, which further ensures that the connection shall be air-tight.

If the springs are connected to the neck of the tube at their outer end and carry the closure at their inner end, a knob must be provided on the closure to actuate the springs. This can be dispensed with, if the connecting springs are joined at their inner ends to the neck of the tube and carry the closure at their outer ends; for then the closure itself also serves as a knob, which simplifies the construction of the device and facilitates its use.

In order that my invention be more clearly understood an example embodying the same is illustrated in the accompanying drawing, in which the same reference characters have been used in all views to indicate corresponding parts. In said drawing—

Figure 2:
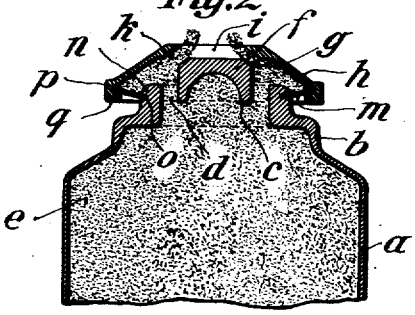
Figure 3:
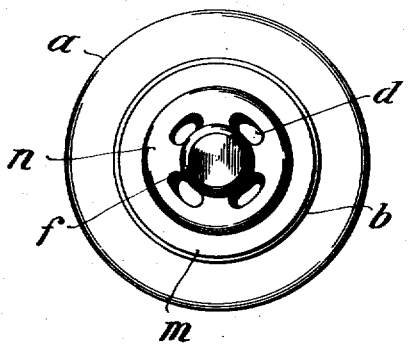

Figs. 1 and 2 are longitudinal sections through the upper part of a tube fitted with the closure, and Fig. 3 is a plan of Fig. 1 with the cap removed.

The body *a* of the tube ends in a neck *b* provided with a cover *c*. In this cover are openings *d*, say four in number, for the passage of the contents *e*, for example a tooth paste. In the middle of the cover *c* is an outwardly projecting cylindrical boss *f*, on the face of which is a coned seating *g* for a cap *h*. The cap *h* is conical, and has a circular face in the middle of which is an opening *i*. This opening is bounded by a seating *k* corresponding to the seating *g* on the boss *f* and so shaped that when the cap is closed its outer surface is flush with that of the boss.

In the neck *b* of the tube an annular leaf spring *m* is rigidly fastened by its inner edge, for instance by pressing a flange *n* on the neck of the tube over the edge of the spring which is placed on a shoulder *o* on the neck. The outer edge of the spring engages with as little play as possible in an annular groove *p* in the lower edge of the cap *h*. The groove *p* may be formed by spinning over the edge *q*. The annular spring *m* is deformed by pressure, so that being held at one edge when its other edge is pushed to one side or the other of a mid position, it can take up only one or other of two end positions, in each of which it is bent—but in opposite directions in the two positions—and exerts a spring pressure.

Fig. 1 shows the tube with the cap *h* closed. The annular spring *m* is bent so that its outer edge is towards the tube, and it presses the seating *k* of the cap *h* upon the seating *g* on the boss *f*, so that air cannot penetrate into the tube between them. Neither can air penetrate around the inner or outer circumference of the spring *m*, since its inner edge is held fast and its outer edge is pressed down upon the lower side of the groove *p*. The contents are therefore well protected against drying while the tube is closed.

To open the cap *h*, the tube *a*, *b*, is held firmly in one hand, the cap is gripped by the fingers of the other hand and pulled away from the tube. The result of this is that so soon as the annular spring *m* is drawn past its mid position, on account of its deformation it snaps into its other end position in which it is bent away from the tube as shown in Figure 2. The spring holds the cap *h* in this position, since the cap rests on the outer edge of the spring. The cap has thus been lifted straight up, so that the seating *k* is raised off the seating *g* of the boss *f*. If the body *a* of the tube is now squeezed the tooth paste *e* is ejected in tubular form from the opening *i* of the cap *h*. The space between the cap *h* and the neck *b* of the tube naturally becomes filled by the paste as it issues from the openings *d*.

To close the tube the cap *h* is pressed down upon it, the spring *m* snapping back into the position shown in Fig. 1, as soon as the spring has been pushed beyond its mid position or neutral position. Since the surfaces of the cap *h* and boss *f* are flush, there is no paste left in the opening of the cap, but what has been ejected can be wiped off completely.

The closure is very simple to manufacture, since all its parts can be made and connected by pressing; and it is easy to use since all that is needed is to pull the cap *h*, which serves as a knob, away from the tube, or to push it towards the tube.

The closure is suitable for other containers besides tubes, for example for certain flasks and like containers, the contents of which can be pressed out of the vessel, or run out of it when it is tilted downward.

What I claim is:

1. A container comprising a body having a discharge opening and a boss projecting in advance of said opening, a cap movable toward and from said body and provided at its outer portion with a discharge opening the edge of which is adapted to become seated on said boss, while the inner portion of the cap surrounds the end portion of said container body, and an annular snap spring the inner edge of which is secured to said body while its outer edge is secured to said cap.

2. A container comprising a body having a discharge opening at one end, a cap movable toward and from said body and provided with a discharge opening the edge of which is adapted to become seated on a portion of said body so as to close the discharge opening of the cap, and an elastic snap device connecting said body with said cap and operating to throw the latter either to the discharge position or to the closed position as soon as the cap passes beyond its median or neutral position.

3. A container comprising a body having a discharge opening at one end, a cap movable toward and from said body and provided with a discharge opening the edge of which is adapted to become seated on a portion of said body so as to close the discharge opening of the cap, the adjacent ends of said cap and of said body being of different diameters and one of them surrounding the other so that they are nested, and an annular snap spring arranged between said nested ends of the cap and body and so placed that in connecting them it will hold the cap in open and closed positions when moved beyond the dead center.

4. A container comprising a body provided with a discharge opening, a cap for said discharge opening movable lengthwise of said body into open or closed position, the movement of said cap in either direction being initiated manually, and an elastic snap device connecting said body with said cap and operating to throw the latter either to the discharge position or to the closed position as soon as the cap passes beyond its median or neutral position.

5. A container comprising a body provided with a discharge opening, an external cap for said discharge opening movable lengthwise of said body into open or closed position, said cap being adapted for direct manual grasping to initiate the movement thereof in either direction, and an elastic snap device connecting said body with said cap and operating to throw the latter either to the discharge position or to the closed position as soon as the cap passes beyond its median or neutral position.

6. A container comprising a body provided with a discharge opening, an external cap for said discharge opening movable lengthwise of said body into open or closed position, said cap being adapted for direct manual grasping to initiate the movement thereof in either direction, and an elastic snap device connecting said body with said cap and operating to throw the latter either to the discharge position or to the closed position as soon as the cap passes beyond its median or neutral position and to maintain the same in the position into which it is thus thrown.

In testimony whereof I hereunto affix my signature at Berlin, Germany, this 23rd day of August, 1932.

WALTHER KALB.